: US 7,456,363 B2
(45) Date of Patent: Nov. 25, 2008

(12) United States Patent
Nishiguchi et al.

(54) ELECTRIC WIRE PROTECTIVE TUBE AND INSULATING COUPLER

(75) Inventors: Masari Nishiguchi, Wakayama (JP); Takuo Chikahira, Osaka (JP)

(73) Assignee: Hastings Fiber Glass Products, Inc., Hastings, MI (US)

( * ) Notice: Subject to any disclaimer, the term of this patent is extended or adjusted under 35 U.S.C. 154(b) by 254 days.

(21) Appl. No.: 11/529,452

(22) Filed: Sep. 28, 2006

(65) Prior Publication Data

US 2007/0144777 A1    Jun. 28, 2007

Related U.S. Application Data

(60) Provisional application No. 60/740,343, filed on Nov. 29, 2005.

(51) Int. Cl.
*H01B 7/00* (2006.01)
(52) U.S. Cl. .................. 174/135; 174/84 R; 174/92; 174/168
(58) Field of Classification Search ............ 174/36, 174/74 R, 79, 84 R, 89, 92, 93, 95, 96, 135, 174/168, 172, 174, 175; 52/101; 361/604, 361/618, 232; 29/592.1, DIG. 13
See application file for complete search history.

(56) References Cited

U.S. PATENT DOCUMENTS

| 2,770,667 | A | | 11/1956 | Runde |
| 2,871,282 | A | | 1/1959 | Tipsord et al. |
| 3,133,984 | A | * | 5/1964 | Farough et al. ............. 174/5 R |
| 3,835,238 | A | | 9/1974 | West |
| 4,628,145 | A | | 12/1986 | Kolcio et al. |
| 5,864,096 | A | * | 1/1999 | Williams et al. ............ 174/139 |
| 5,873,324 | A | * | 2/1999 | Kaddas et al. ............. 119/174 |
| 6,020,560 | A | | 2/2000 | Kamel et al. |
| 6,239,357 | B1 | | 5/2001 | Mabry, III et al. |
| 6,878,883 | B1 | * | 4/2005 | Rauckman ................... 174/135 |
| 7,276,665 | B1 | * | 10/2007 | Rauckman ................... 174/135 |

* cited by examiner

*Primary Examiner*—William H Mayo, III
(74) *Attorney, Agent, or Firm*—Flynn, Thiel, Boutell & Tanis, P.C.

(57) ABSTRACT

A line guard is configured so as to have a very large air gap with a small overall physical size of the device. Opposed interleaved sets of plural insulating leaves are formed along a discontinuity extending along the length of the line guard so as to greatly extend the length of the air gap. This air gap structure allows the overall size of the line guard to be small thus providing advantages of reduced weight, ease of handling, and ease of storage. A two piece coupler apparatus is provided for joining adjacent line guards in a way that is both flexible and provides sufficient dielectric to operate at high voltages in a small package.

28 Claims, 8 Drawing Sheets

ELECTRIC WIRE PROTECTIVE TUBE AND INSULATING COUPLER

CROSS REFERENCE TO RELATED APPLICATIONS

This application claims the benefit of U.S. Provisional Application Ser. No. 60/740,343, filed Nov. 29, 2005, which is incorporated herein by reference in its entirety.

FIELD OF THE INVENTION

The present invention relates to devices that protect workers from contact with electrically energized conductors. More specifically, the present invention relates to an insulating cover that encloses an energized conductor to provide protection from contact with the conductor, thus protecting linemen or other workmen from accidental contact with energized electrical conductors.

BACKGROUND OF THE INVENTION

Protective covers for power lines, commonly referred to as "line guards" have been used by linemen working in the vicinity of energized electrical conductors to cover the nearby conductors and associated hardware, such as insulators on which the conductors are mounted, to prevent workers or equipment from accidentally coming into contact with energized conductors. Such contact would clearly be hazardous causing shock and possibly death. These protective covers are typically formed of a dielectric material such as rubber, fiberglass, or plastic. The protective covers are generally used by being placed over the conductors and possibly associated insulators while the workmen are in the vicinity of the conductor.

Some protective covers have been embodied as elongated tubes with spiral passage ways extending from the exterior of the tube to a central space within the tube sized to fit the conductor. For additional details of such protective covers, reference can be made to U.S. Pat. No. 4,628,145, U.S. Pat. No. 3,835,238, U.S. Pat. No. 2,770,667 and U.S. Pat. No. 2,871,282.

Other protective covers have been embodied in the form of elongate structures that fold around an electrical conductor and snap together to enclose the conductor. For additionally details of such protective covers, reference can be made to U.S. Pat. No. 6,239,357 and U.S. Pat. No. 6,020,560.

A problem with the protective covers that are available for use on high voltage conductors is that they are bulky or heavy. The protective covers made of rubber are quite heavy because of their large size that is dictated by the need for a large air gap. The protective covers made from other materials may not be as heavy as rubber ones, but they also rely upon a large air gap for insulation, and the large air gap makes the protective covers large and bulky. In either case, the protective covers are awkward to work with and place over or remove from the electrical conductors. Additionally, the bulky protective covers pose a storage challenge since they take up so much space when not in use.

Thus, what is needed is a way to isolate energized conductors at high voltages (e.g., 25 kV) without need for a protective cover that is bulky or heavy.

SUMMARY OF THE INVENTION

One aspect of the present invention is the use of plural interleaving dielectric leaves that provide a large air gap in a small overall package.

Another aspect of the present invention is that it provides isolation from an energized conductor at high voltage without the protective tube being made of heavy rubber.

Yet another aspect of the present invention is that it provides isolation from an energized conductor at high voltages without a protective tube needing to be bulky.

By making the protective tube out of a lightweight plastic (for example, polyethylene) and using interleaving dielectric leaves to provide a large air gap, a number of advantages accrue. A protective cover embodied according to the present invention has a relatively small size, has low weight, and is easy to store since it is not bulky and takes up less space.

A coupler is used to join together more than one such protective cover in series. The coupler is of a two piece construction with a first inner insulation barrier that has interleaving dielectric leaves like those of the protective cover. A second outer insulating barrier surrounds the first insulating barrier. The inner insulating barrier has a thinned portion providing a hinge for opening flexibility. The second outer insulating barrier covers the hinged portion of the inner barrier and provides a spring bias to help keep the dielectric leaves of the first barrier joined together in an interleaved relationship.

Additional features and advantages of the present invention will become evident upon review of the following detailed description in conjunction with the accompanying drawings.

DETAILED DESCRIPTION

When it is desired to isolate an energized conductor from possible contact with a worker, the conductor is wrapped within an insulating material. When the conductor is energized at great voltages, the thickness of the insulating material, or the air gap provided by the design of the material, must be of a commensurate large size. Although it is not a challenge to find a material that will insulate an energized conductor at 25 kV, it remains a challenge to provide an air gap of sufficient size. The air gap is useful in order to allow for the cover to be installed over and removed from the electric conductor without removing the electric conductor from its circuit.

Rather than making the gap larger by making the part larger, as is done in conventional devices, the present invention makes the length of the air gap long by the use of overlapping dielectric leaves, so that the overall size of the protective tube (or "line shield") could be maintained relatively small. This provides advantages in weight and required storage space.

A coupler apparatus is useful to join together line guards in series with one another while maintaining their protective properties at the joint. According to the present invention, a two piece coupler configuration has been discovered that allows for sufficient flexibility for the coupler to be easily applied, while at that same time providing sufficient dielectric so as to provide shielding at high voltages, for example, at 25 kV.

Figure 1:
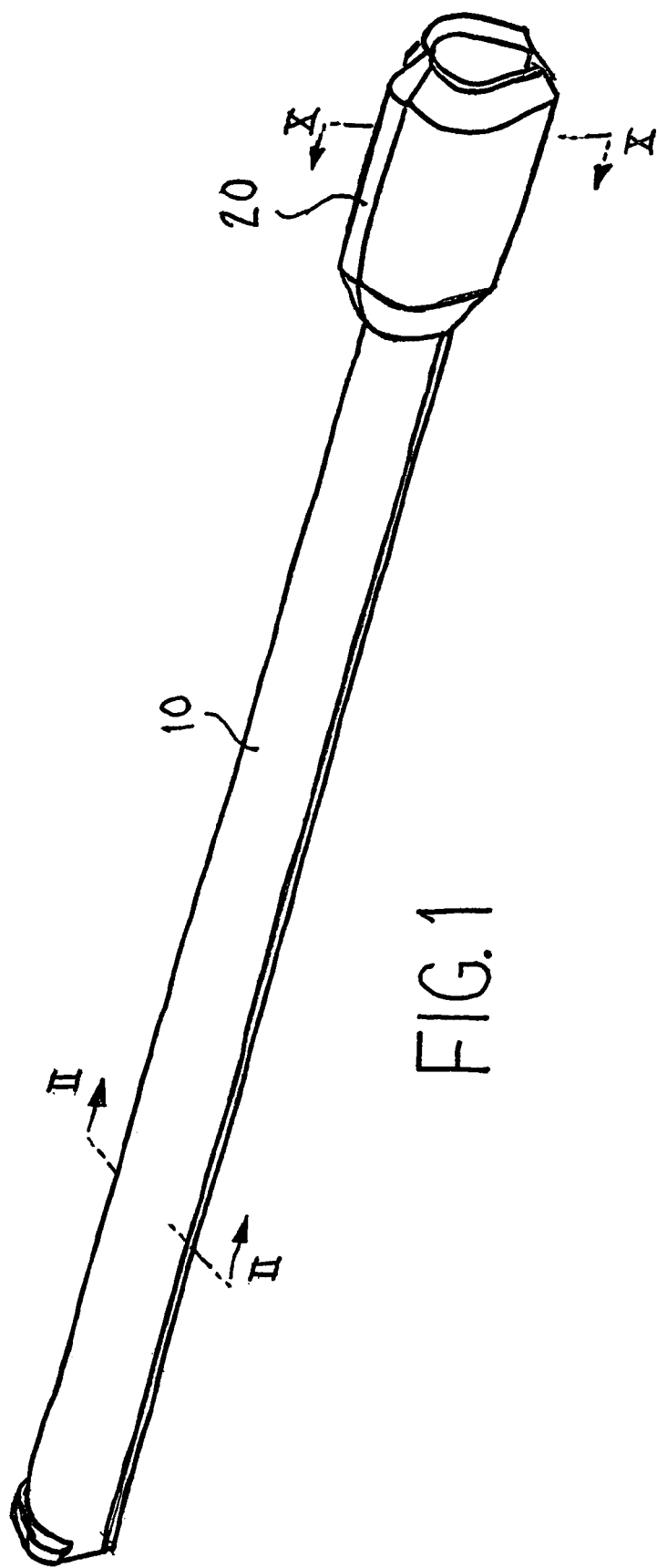
FIG. 1 illustrates a perspective view of the combination of an electric wire protective tube and a coupler apparatus according to embodiments of the present invention.

Referring to FIG. 1, a line guard 10 according to the present invention is shown in perspective in combination with a coupler 20 also according to the present invention. The line guard 10 and the coupler 20 are separable from one another, but are shown in a joined state.

Figure 2:
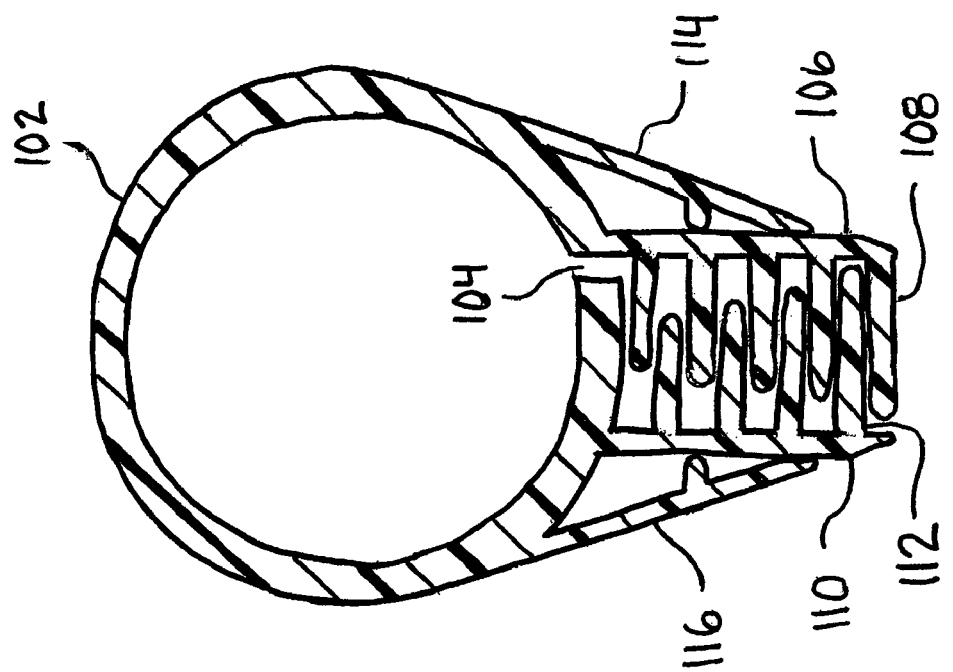
FIG. 2 illustrates a cross sectional view of an electric wire protective tube according to embodiments of the present invention.

Referring to FIG. 2, a cross sectional view of a line guard according to the present invention is illustrated. An insulating tube 102 forms the main body of the line guard. A discontinuity 104 is formed along the entire length of the insulating tube 102. The discontinuity 104 is formed in the insulating tube 102 for the purpose of permitting the insulating tube 102 to be placed over a conductive wire (not shown).

A pair of mutually confronting insulating legs 106, 110 project radially outwardly from the insulating tube 102. Plural planar leaves 108 extend from one insulating leg 106 toward the other insulating leg 110. Plural planar leaves 112 extend from that insulating leg 110 to the opposed insulating leg 106. These opposed sets of insulating leaves 108, 112 are arranged so as to interleave with one another, thereby providing an elongated air gap extending from the discontinuity 104 through the interstitial spaces between the leaves 108, 112 to the exterior of the line guard. The elongation of the air gap increases the withstand voltage of the line guard and creeping distance along the insulating leaves 108, 112 is increased. This reduces the risk of creeping discharge while maintaining a small overall device size.

The insulating leaves 108, 112 protrude a relatively larger amount toward the outside and a relatively smaller amount toward the inside. This arrangement strikes a balance of provide for a long creeping distance while also making it easier to place the line guard over the electric wire. Although the invention may be alternatively embodied so as to have all the leaves 108, 112 protrude the same amount so as to provide for an even greater creeping distance, such a configuration has been found to be more difficult to place onto an electric wire.

Adjacent each of the insulating legs 106, 110 is a respective insulating wall 114, 116. The insulating walls 114, 116 extend from the outside of the insulating tube 102 so as to cover the joint where the insulating legs 106, 110 extend radially outward from the insulating tube 102, and terminate so as to be touching the insulating legs 106, 110. The insulating walls 114, 116 provide enhanced insulating strength due to the combination of an added thickness of insulating material and due to the cavity of air formed between the insulating walls 114, 116, the insulating tube 102, and the insulating legs 106, 110.

Figure 3:
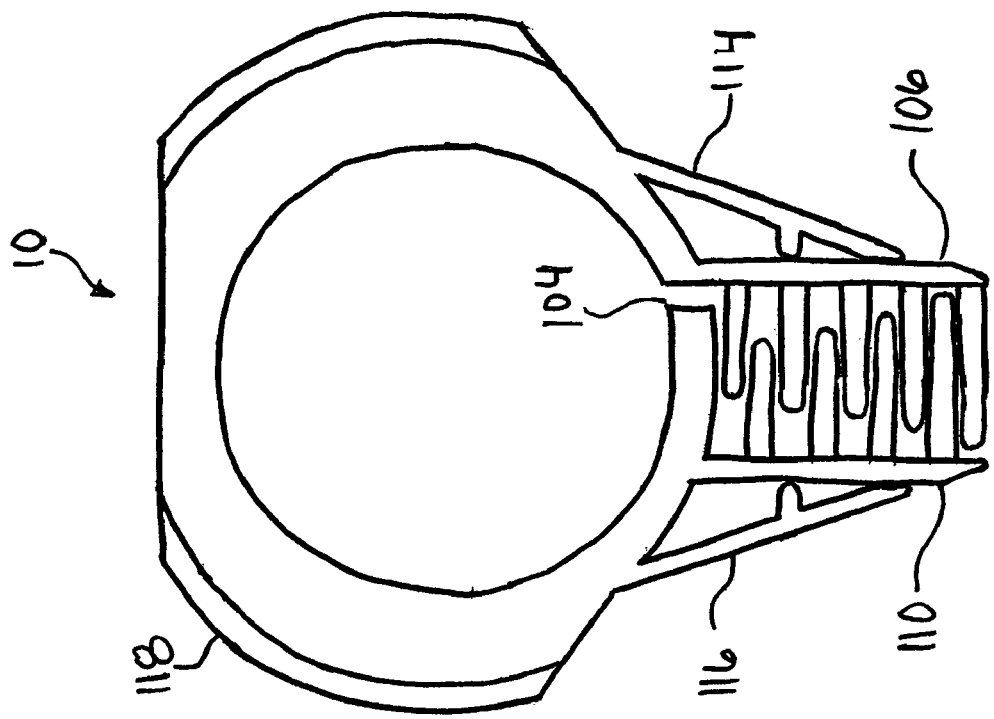
FIG. 3 illustrates an end on elevational view of an electric wire protective tube according to embodiments of the present invention.

Referring to FIG. 3, an end on elevational view of a line guard 10 according to the present invention is illustrated. The discontinuity 104 is shown as extending all the way to the end of the line guard 10. The insulating legs 106, 110 and the insulating walls 114, 116 are shown where they end at the end of the insulating tube 102 (refer to FIG. 2). The insulating walls 114, 116 contact the sides of the insulating legs 106, 110 and the spaces therebetween are exposed to view from this end on view. A flange 118 is disposed at the end of the line guard 10 and is adapted to fit into a coupler according to the present invention to connect with the coupler and indirectly with an adjacent line guard. Likewise, a flange 120 (refer to FIG. 4) is disposed at the opposite end of the line guard 10, adapted to the same purpose.

Figure 4:
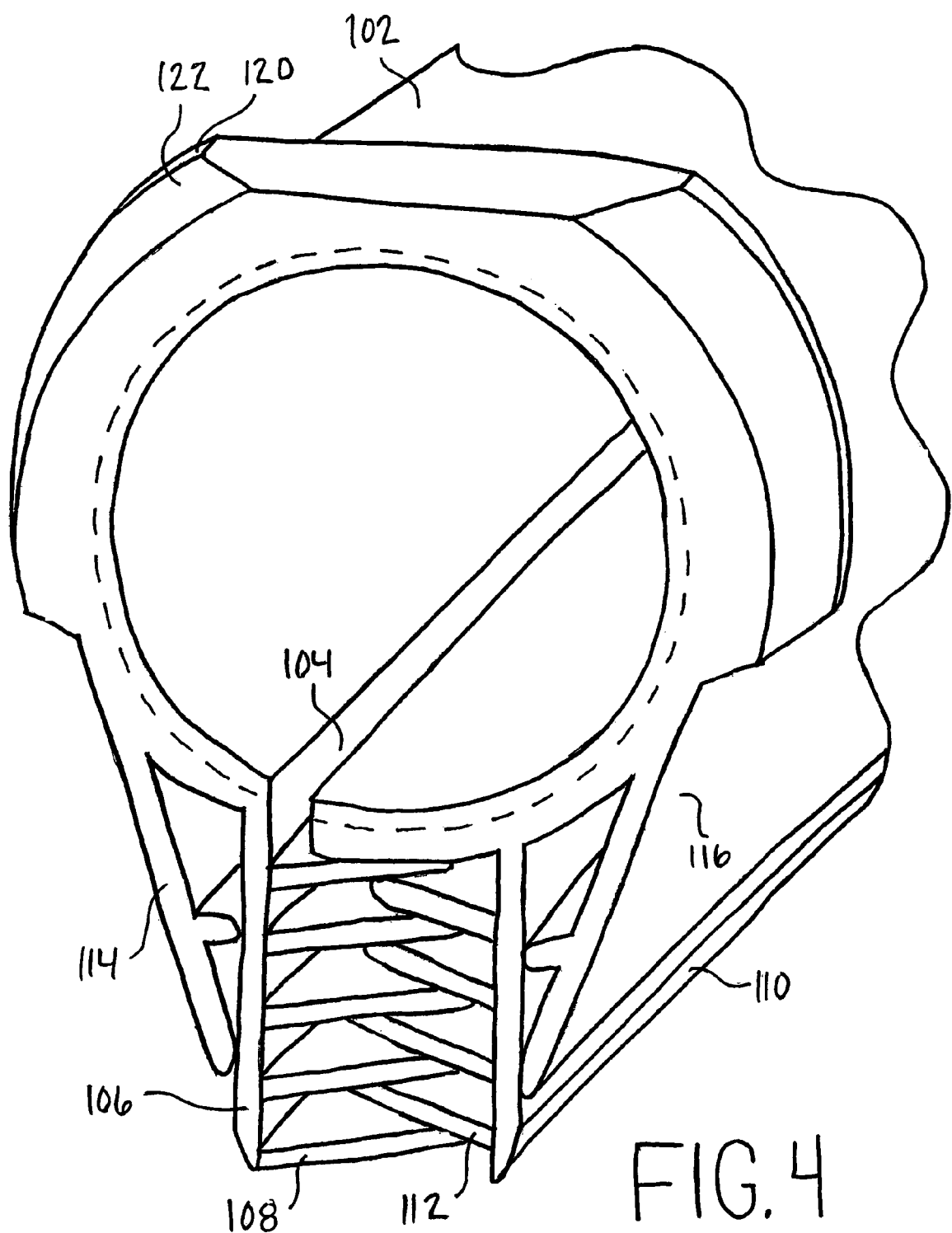
FIG. 4 illustrates a detailed perspective view of one end of an electric wire protective tube according to embodiments of the present invention.

Referring to FIG. 4, a detail perspective view of an end of a line guard according to the present invention is illustrated. The insulating tube 102 can be seen as extending toward the end and terminating with a flange 120. The flange 120 is provided for interconnection with a coupler according to the present invention. An outer edge 122 of the flange 120 is beveled to enhance ease of insertion of the line guard into a coupler. The discontinuity 104 is shown as extending all the way to the end of the line guard. The insulating legs 106, 110 and the insulating walls 114, 116 are shown as extending outwardly from the exterior of the insulating tube 102 and extending along the insulating tube 102 all the way to its end. The insulating leaves 108, 112 are shown as extending toward the respective opposed insulating legs 106, 110 so as to interleave with one another.

An optional feature of the line guard is to form the insulating tube 102 in two layers having preferably contrasting colors. The boundary of these two layers is indicated in FIG. 4 by the phantom line on the end face of the line guard. The material of the layers is the same (e.g., polyethylene) so as to provide consistent insulating properties, but the different colored layers act as a wear indicator. If either layer is worn away to the extent that the contrasting color of the other layer shows through, this acts as a visual indication that enough wear has occurred sufficient to compromise the protective properties of the line guard. The user would then know to take the line guard out of service due to the excessive wear bringing about a potentially unsafe condition.

Figure 5:
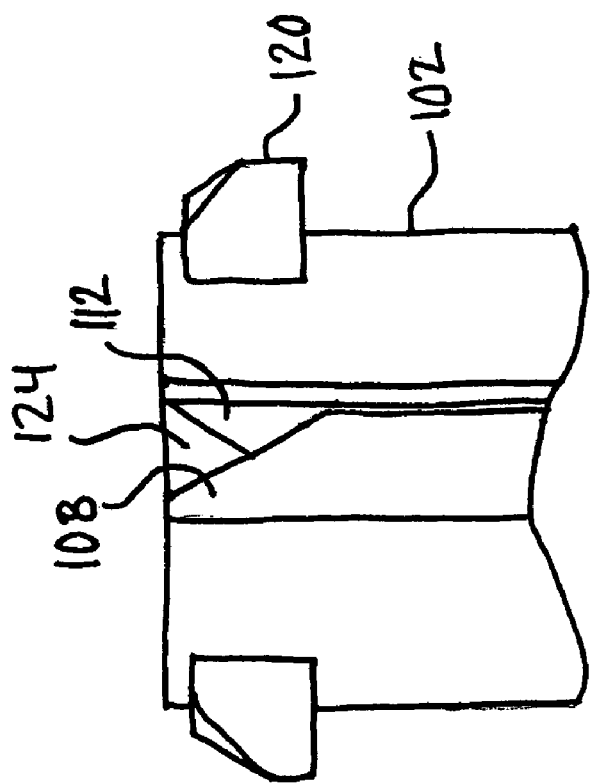
FIG. 5 illustrates a bottom plan detail view of one end of an electric wire protective tube according to embodiments of the present invention.

Referring to FIG. 5, a bottom plan detail view is illustrated of one end of a line guard according to embodiments of the present invention. The end of insulating tube 102 ending at flange 120 is shown. According to the illustrated embodiment, the leaves 108, 112 are shaped at the ends so as to form a "V" profile gap 124 as viewed from the bottom of the line guard. The leaves 108, 112 have a like gap (not shown) formed at the other end of the line guard. These V profile gaps at the extreme ends of the insulating leaves 108, 112 facilitate the line guard being placed over an electrical conductor by reducing the amount of effort necessary to initiate insertion of the electrical conductor into the line guard.

Figure 6:
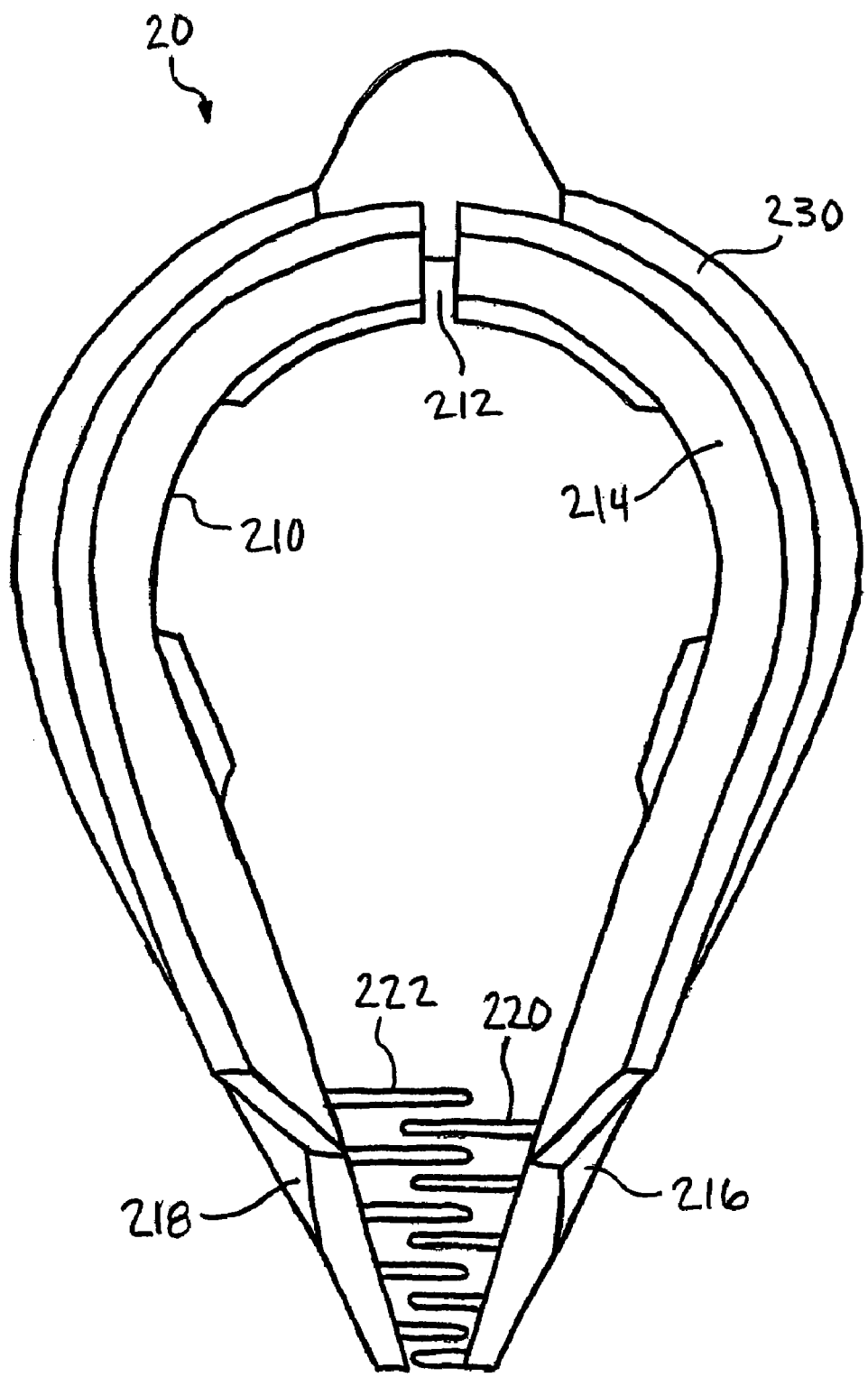
FIG. 6 illustrates an end on elevational view of a coupler apparatus according to embodiments of the present invention.

Referring to FIG. 6, an end on elevation view of a coupler apparatus according to the present invention is illustrated. The coupler 20 has an inner insulating cover base 210 surrounded by an insulating outer cover 230. The cover base 210 has a gap 212 at its apex which enhances the flexibility of the coupler in opening up to engage with the juxtaposed ends of adjacent line guards. Additionally, the cover base 210 has a flared flange 214 that also aids in engaging the coupler 20 with the end of a line guard. This flared profile at the end of the coupler 20 facilitates the coupler 20 being placed over an end of a line guard by reducing the amount of effort necessary to initiate insertion of the line guard into the coupler 20.

The cover base 210 has a pair of insulating closing bodies 216, 218 that extend outwardly from the cover base 210 and converge toward one another in an opposed manner. Plural insulating leaves 220 extend from one closing body 216 toward the opposed closing body 218. Likewise, plural insulating leaves 222 extend from that closing body 218 toward the other closing body 216. The plural leaves 220, 222 are arranged so as to interleave with one another and thus, provide a long air gap from the interior of the coupler through the interstitial spaces between the leaves 220, 222 to the outside of the coupler 20. As with the insulating leaves 108, 112 of the line guard 10, the insulating leaves 220, 222 of the coupler 20 increase the withstand voltage and the creeping distance via the elongated air gap. Optionally, the insulating leaves 108, 112, 202, 222 of the line guard 10 and the coupler 20 can be formed having a tapered shape to make it easy for the respective leaves to be fit together.

The outer cover 230 provides additional insulation over the hinge structure (not shown) of the cover base 210 and provides a spring bias that pushes the closing bodies 216, 218 toward one another.

Figure 7:
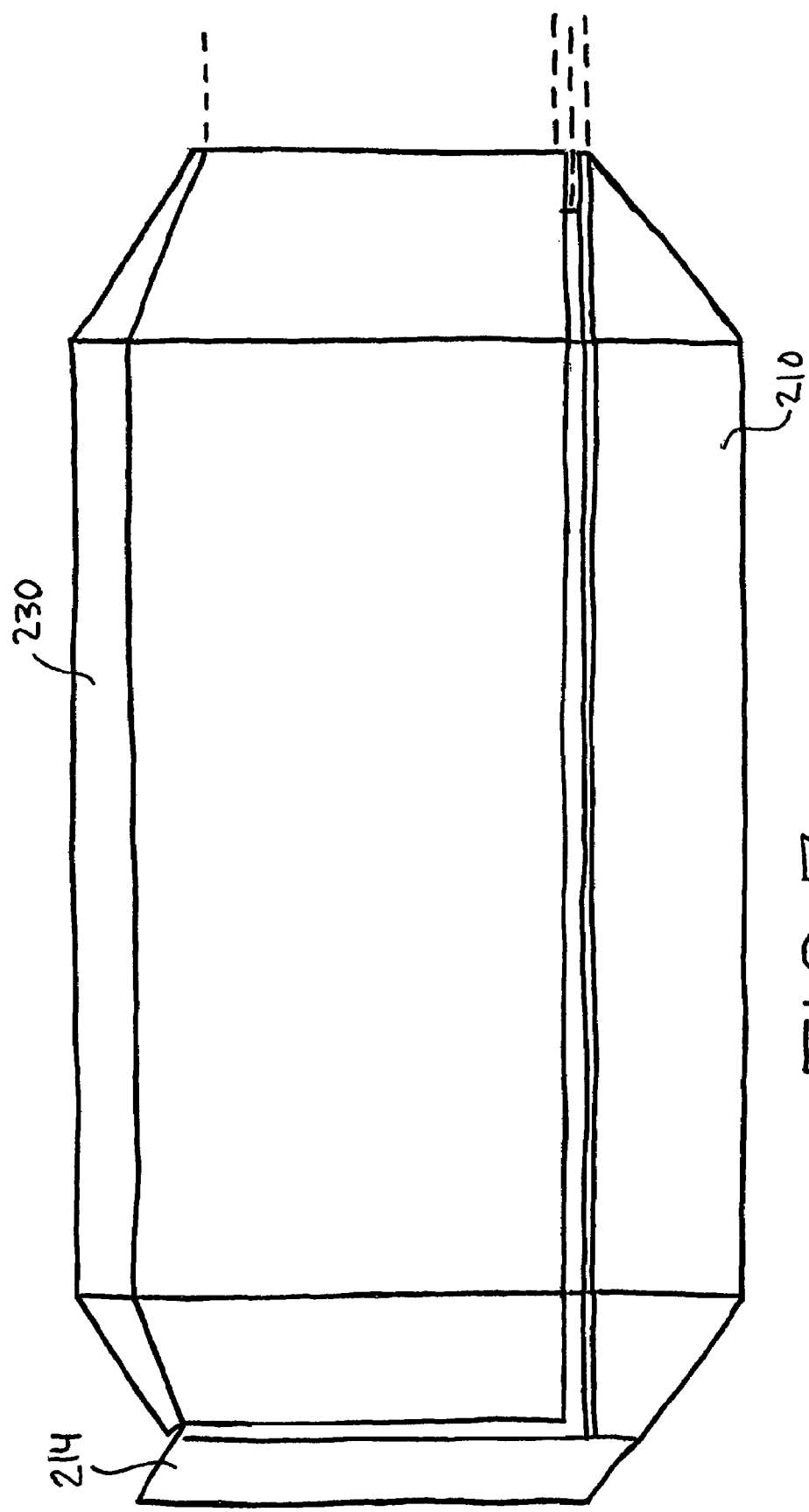
FIG. 7 illustrates a side elevational view of a coupler apparatus according to an embodiment of the present invention.

Referring to FIG. 7, a side elevational view of the coupler apparatus according to the present invention is illustrated. The outer cover 230 is shown with the cover base 210 extending from its bottom side. The flared flange 214 of the cover base is shown on the left. On the right the phantom lines indicate where a line guard would extend from the coupler when connected thereto.

Figure 8:
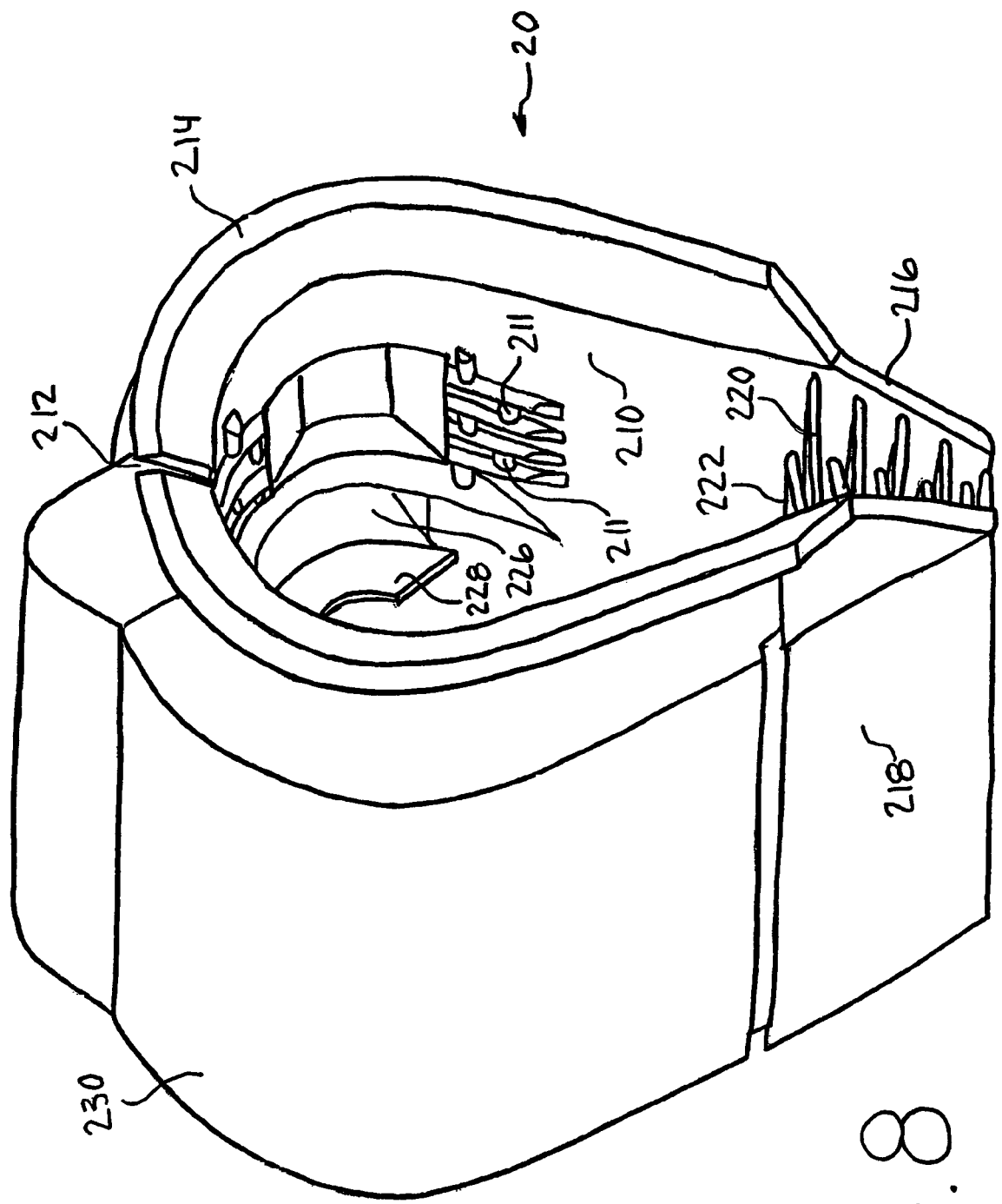
FIG. 8 illustrates a perspective view of a coupler apparatus according to an embodiment of the present invention.

Referring to FIG. 8, a perspective view of a coupler apparatus 20 according to the present invention is illustrated. The cover base 210 is shown with the pair of extending members 216, 218 extending downward and in an opposed manner to one another, with their opposed insulating leaves 220, 222 interleaving with one another. The flared flange 214 is shown with a hinge gap 212 provided for flexibility to enable engagement with a line guard. The outer cover 230 is shown extending around the top of the cover base 210.

When a line guard is inserted into the coupler 20, the line guard and coupler are removably secured to one another by engagement of a flange 118, 120 (refer to FIGS. 3, 4) on the end of the line guard with a recess 226 inside the coupler 20. The end face of the line guard abuts a stop wall 228 that prevents insertion of the line guard past the point where the flange aligns with the recess. Another recess (not shown) is disposed on the other side of the stop wall 228 to removably secure a second line guard inserted into the coupler 20 from its other end in a like fashion.

Raised beads 211 are provided on the interior surface of the cover base 210. These raised beads 211 are shaped to provide contact with the exterior surface of an inserted line guard while reducing the contacting area between the flange 118 of the line guard and the coupler 211 to make it easier to insert the flange into the coupler.

If it is desired to secure a line guard to a coupler in a more permanent fashion, the coupler and the line guard can be welded together where a protruding part of the coupler contacts the line guard. For example, sonic welding is a suitable way to permanently secure the coupler over an end of a line guard.

Figure 9:
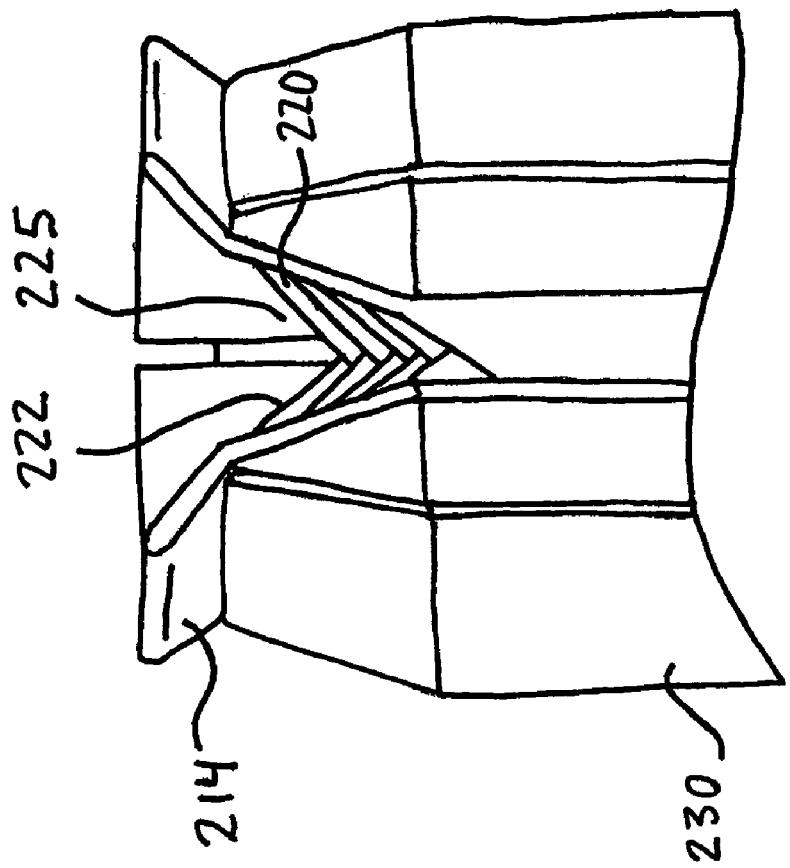
FIG. 9 illustrates a bottom plan detail view of one end of coupler apparatus according to embodiments of the present invention.

FIG. 9 illustrates a bottom plan detail view of one end of coupler apparatus according to embodiments of the present invention. The end of the coupler having the flared flange 214 extending out of the outer cover 230 is shown. According to the illustrated embodiment, the leaves 220, 222 are shaped at the ends so as to form a "V" profile gap 225 as viewed from the bottom of the coupler. The leaves 220, 222 have a like gap (not shown) formed at the other end of the coupler. These V profile gaps at the opposite ends of the insulating leaves 220, 222 facilitate the coupler being placed over an electrical conductor by reducing the amount of effort necessary to initiate insertion of the electrical conductor into the coupler.

Figure 10:
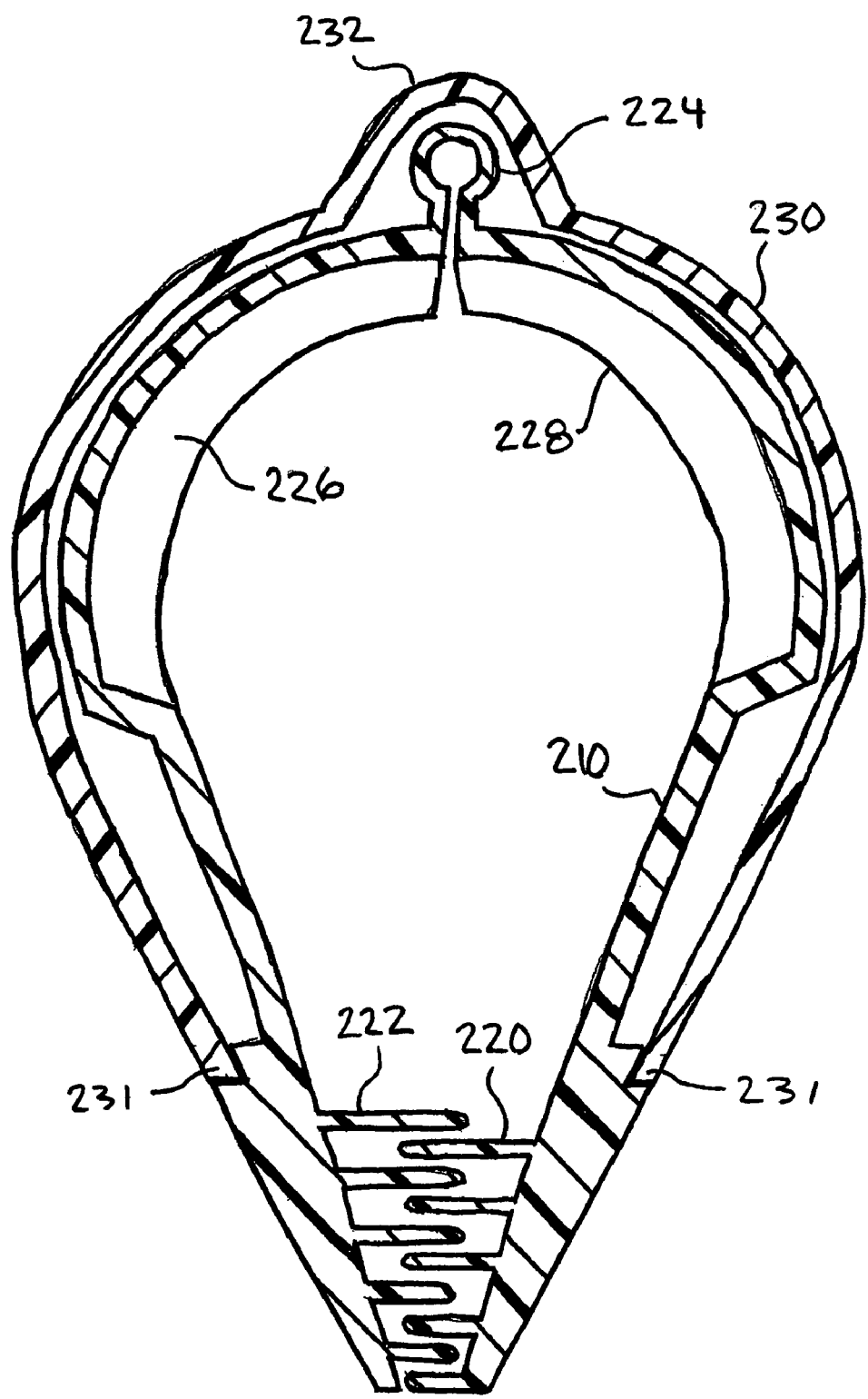
FIG. 10 illustrates a cross sectional view of a coupler apparatus according to an embodiment of the present invention.

Referring to FIG. 10, a cross sectional view of a coupler apparatus 20 according to the present invention is illustrated. The cover base 210 is shown with opposed ridges 220, 222 and a hinge 224 at its apex. Additionally a recessed portion 226 is shown for engagement with a flange, for example either of the flanges 118 (refer to FIG. 3), 120 (refer to FIG. 4) disposed at opposing ends of the line guard. The outer cover 230 is shown with a blister portion 232 to extend up and over the hinge structure 224 of the cover base 210. The blister portion 232 provides additional insulation over the hinge structure 224. The withstand voltage performance of the device is increased by providing a space between the cover base 210 and the outer cover 230.

The coupler apparatus 20 has a two piece configuration in order to make the creeping distance longer and to make shaping easier. Formation of the hinge 224 structure is easier if the cover base 210 is shaped so as to be open in a natural state. Placing the outer cover 230 over the cover base 210 accomplishes two things: it increases the withstand voltage about the hinge 224 and it provides opposed forces to close the cover base 210.

The outer cover 230 has circumferential ends 231 that elastically nip tapered faces of the cover base 210. This leaves the outer cover 230 attached to the cover base 210 by contact of the ends 231 each contacting a step portion of the base 210. This configuration of the outer cover 230 with respect to the cover base 210 provides for formation of the space therebetween discussed above and it is not necessary to otherwise fasten the outer cover 230 to the cover base 210 because once assembled to one another as an integrated coupler apparatus it becomes difficult to detach the outer cover 230 from the cover base 210. Alternatively, the outer cover 230 is ultrasonically welded to the cover base 210 to affix them permanently to one another.

Although polyethylene has been described as an example of a suitable material from which to form devices according to the present invention, any material having similar dielectric and plastic properties would be suitable for practicing the invention.

Although the present invention has been described above in terms of exemplary embodiments, it will be understood by those of ordinary skill in the art that various modifications and improvements may be made with respect to the described embodiments without departing from the spirit and scope of the present invention.

What is claimed is:

1. An electric wire protective tube configured for attachment to an electric wire, comprising:
    a cylindrical tube base formed of an electrical insulating material, the cylindrical tube base being discontinuous in a circumferential direction thereof;
    two legs formed of an electrical insulating material, the legs projecting outwardly in a radial direction of the cylindrical tube base from circumferential ends of the cylindrical tube base, confronting faces of the two legs being formed to be concavo-convex so that the two legs are fitted to each other, whereby the circumferential ends of the cylindrical tube base are made continuous with each other; and
    two walls formed of an electrical insulating material, for covering basal ends of the legs which continue from the cylindrical tube base.

2. The electric wire protective tube according to claim 1, wherein the confronting faces of the legs each have a plurality of ridges of convexity so that the confronting faces are concavo-convex, which ridges are provided in the radial direction of the cylindrical tube base to be spaced from each other, and the legs are fitted to each other by putting the ridges of convexity of one of the two legs in concavities between the ridges of convexity of the other leg, whereby the circumferential ends of the cylindrical tube base are made continuous with each other.

3. The electric wire protective tube according to claim 2, wherein the ridges of convexity of at least one of the legs have a tapered form at least at a distal end thereof.

4. The electric wire protective tube according to claim 2, wherein out of the ridges of convexity of the legs, ridges of convexity situated outward in the radial direction of the cylindrical tube base project from the legs more than ridges of convexity of the legs situated inward in the radial direction of the cylindrical tube base.

5. The electric wire protective tube according to claim 1, wherein the walls are disposed so as to leave a space between the walls and the legs, respectively.

6. The electric wire protective tube according to claim 5, wherein the walls have a basal end continuing from the tube base, and a distal end contacting the leg.

7. The electric wire protective tube according to claim 5, wherein the wall portions have a projecting support piece formed on a middle part thereof which projecting support piece has a distal end contacting the leg.

8. A coupler apparatus configured for attachment to an object to be protectively insulated, comprising:
   a cover main body formed of an electric insulating material, the cover main body including,
   a cylindrical cover base being discontinuous in a circumferential direction thereof, and
   two closing bodies for closing an opening between circumferential ends of the cover base, the closing bodies being disposed on the circumferential ends, respectively, confronting faces of the closing bodies being formed to be concavo-convex so that the closing bodies are fitted to each other, whereby the circumferential ends are made continuous with each other.

9. The coupler apparatus according to claim 8, wherein the confronting faces of the closing bodies each have a plurality of ridges of convexity so that the confronting faces are concavo-convex, which ridges are provided in the radial direction of the cylindrical cover base to be spaced from each other, and the closing bodies are fitted to each other by putting the ridges of convexity of one of the two closing bodies in concavities between the ridges of convexity of the other closing body, whereby the circumferential ends of the cylindrical cover base are made continuous with each other.

10. The coupler apparatus according to claim 8, further comprising an outer cover body formed of an electric insulating material, the outer cover body being attached to the cover main body.

11. The coupler apparatus according to claim 10, wherein the outer cover body is elastically deformable and attached to the cover main body, the cover body is resiliently nipped by the outer cover body, whereby the circumferential ends of the cover main body move closer to each other.

12. The coupler apparatus according to claim 11, wherein the cover base has a hinge portion on a middle between the circumferential ends thereof.

13. The coupler apparatus according to claim 12, wherein the hinge portion is made to be thinner than a remaining portion of the cover main body and is formed integrally with the remaining portion, and the cover main body is open in a natural state so as to leave a space there between.

14. The coupler apparatus according to claim 12, wherein the outer cover body is attached to the cover main body in a state where the hinge portion is covered from outside.

15. The coupler apparatus according to claim 10, wherein the outer cover body is attached to the cover main body in a state where a space is left between the outer cover body and the cover main body.

16. The coupler apparatus according to claim 10, wherein the cover main body and the outer cover body are of different colors.

17. The coupler apparatus according to claim 10, wherein the electric insulating material is a material applicable to ultrasonic-welding of the cover main body and the outer cover body.

18. The coupler apparatus according to claim 8, wherein the object to be protectively insulated is a butt portion of two electric wire protective tubes to be attached to an electric wire in a state of abutting on each other in an axial direction thereof, and the electric wire protective tubes are coupled together in a state where the cover apparatus is attached to the butt portion.

19. The coupler apparatus according to claim 18, wherein the cover apparatus is attached to the butt portion of the electric wire protective tubes according to claim 1.

20. An electric wire protective tube configured for attachment about an electric wire, the electric wire protective tube comprising:
   an insulating tube having a substantially circular cross section and having a discontinuity formed through the circumference of the insulating tube and extending longitudinally along the insulating tube;
   a pair of mutually-confronting insulating legs connected to the insulating tube, the insulating legs projecting outwardly in a radial direction from the insulating tube on opposed sides of the discontinuity and extending longitudinally along the insulating tube, confronting faces of the pair of insulating legs each having plural insulating leaves extending longitudinally along the insulating legs, wherein each of the plural insulating leaves is disposed to interleave with at least one confronting insulating leaf; and
   a pair of insulating walls connected to the insulating tube, each of the pair of insulating walls extending outwardly from a location on the insulating tube spaced apart from the location where a respective one of the pair of mutually-confronting insulating legs extends from the insulating tube, wherein each of the pair of insulating walls extends longitudinally along the insulating tube, and wherein each of the pair of insulating walls has a free end that is disposed so as to touch the respective one of the pair of mutually-confronting insulating legs.

21. The electric wire protective tube of claim 20, wherein the insulating walls extend so as to cover the locations where the insulating legs extend from the insulating tube.

22. A coupler apparatus configured for attachment to an object to be protectively insulated, the cover apparatus comprising:
   an insulating cover base having a substantially circular cross section and having a discontinuity formed through the circumference of the insulating cover base; and
   an opposed pair of insulating closing bodies extending from the insulating cover base on opposed sides of the discontinuity toward one another to provide for closing an opening in the cover base across the discontinuity, the insulating closing bodies having confronting faces and each of the confronting face has plural insulating leaves extending longitudinally along the insulating closing body, wherein each of the plural insulating leaves is disposed to interleave with at least one confronting insulating leaf, so that the insulating closing bodies are fitted to each other.

23. The coupler apparatus of claim 22, further comprising:
an insulating outer cover attached to the insulating cover base, the outer cover being elastically deformable and the cover base being resiliently nipped by the outer cover so as to bias the opposed pair of insulating closing bodies toward one another.

24. The coupler apparatus of claim 23, wherein the outer cover is ultrasonically welded to the cover base.

25. The coupler apparatus of claim 22, wherein the cover base comprises a hinge disposed across from the discontinuity.

26. The coupler apparatus of claim 25, wherein the hinge is formed in the cover base as a thinned portion formed integrally therein.

27. The coupler apparatus of claim 26, further comprising:
an insulating outer cover attached to the insulating cover base, the outer cover being elastically deformable and the cover base being resiliently nipped by the outer cover so as to bias the opposed pair of insulating closing bodies toward one another;
wherein the hinge is covered by the outer cover from the outside.

28. The coupler apparatus of claim 22, wherein the cover base is adapted to couple over adjacent ends of a pair of electric wire protective tubes.

* * * * *